Patented July 9, 1935

2,007,645

UNITED STATES PATENT OFFICE 2,007,645

COMPOUND GLASS

Emil Geisel, Berlin-Charlottenberg, Germany, assignor to Rohm & Haas A.-G., Darmstadt, Germany No Drawing. Application January 2, 1929, Serial No. 329,958. In Germany March 16, 1928

8 Claims. (Cl. 49—81)

My invention relates to the manufacture of a compound glass.

Various methods have hitherto been adopted for the manufacture of compound glass, i. e., glass which is made up by the adhesion of superimposed or interposed transparent flexible laminæ so that it does not splinter on fracture. Thin layers of gelatine, celluloid, viscose, acetyl cellulose, casein or a plurality of these substances have been proposed already as reinforcing agents. All these processes however have great disadvantages.

Gelatine, for example is sensitive to atmospheric effects and to attack by microbes.

Celluloid and similar substances do not adhere to glass, and necessitate a special adhesive layer, which is produced either by softening the celluloid by means of a solvent, or by applying gelatine or other substances which adhere to glass.

All the known processes have the disadvantage that in order to make them adhere to one another the surfaces must be treated with liquids of a suitable type which must then be removed again by evaporation. This last process is particularly difficult and troublesome.

Further the processes necessitate a considerable pressure acting over a long period which is produced either by hydraulic means or by vacuum. Finally all the substances mentioned have a tendency to lose their clearness to a more or less great extent during use, and to become discolored.

All these disadvantages are avoided by my new process for producing a compound glass.

According to my invention the products of polymerization of the ethyl ester of acrylic acid, are used as the re-inforcing or uniting layer. These adhere to glass without the use of any adhesive, are absolutely clear and as transparent as glass and possess an extraordinary elasticity similar to that of rubber and are absolutely impervious to atmospheric effects. The ethyl ester of acrylic acid produced in known manner is a liquid which has a tendency to polymerize and thereby to solidify, and a thin layer gives a clear transparent sheet or film.

One substantial advantage of my improved process is that the ester mentioned can be applied to a glass plate while still in the liquid state, a second sheet of glass can then be placed over it and the polymerization be allowed to take place between the two sheets of glass. The improved compound glass is then produced without any further treatment.

Whilst the processes hitherto used require absolutely plane glass surfaces, these are, of course, not necessary in my improved process.

Finished films of polymerization products of the ethyl ester of acrylic acid can also be placed between two sheets of glass and united with the glass by light pressure and under application of heat. The surface of the film softens and adheres to the glass surface without the use of any softening agents, and solidifies again on cooling. The high elasticity of my reinforcing material permits the use of ordinary glass.

For many purposes it suffices to coat the glass on one side only with a film instead of producing the film between two sheets of glass. This is possible in the manner described as is also the coating of a sheet of glass with films on both sides and the combination of more than two sheets of glass.

The polymerization products of the ethyl ester of acrylic acid can be wholly or partially replaced by those of the methyl ester of acrylic acid owing to their absolutely similar properties.

Various modifications and changes may be made without departing from the spirit and the scope of the invention, and I desire, therefore, that only such limitations shall be placed thereon as are imposed by the prior art.

I claim as my invention:

1. Laminated glass comprising a plurality of glass sheets adhesively joined by an intermediate layer comprising the elastic product of polymerization of the methyl ester of acrylic acid.

2. Laminated glass comprising a plurality of glass sheets adhesively joined by an intermediate layer comprising a mixture of the elastic products of polymerization of the ethyl and methyl esters of acrylic acid.

3. A process for making laminated glass which comprises adhesively joining a plurality of glass sheets by means of the elastic product of polymerization of the methyl ester of acrylic acid.

4. A process of making laminated glass which comprises adhesively joining a plurality of glass sheets by means of a mixture of the elastic products of polymerization of the ethyl and methyl esters of acrylic acid.

5. The process as described in claim 3 in which the process is carried out under heat and pressure.

6. The process as described in claim 4 in which heat and pressure are employed.

7. Laminated glass comprising a plurality of glass sheets having interposed therebetween and directly in contact therewith, one or more layers comprising a mixture of the elastic products of polymerization of the ethyl and methyl esters of acrylic acid.

8. Laminated glass comprising a plurality of glass sheets having interposed therebetween and directly in contact therewith, one or more layers of the elastic product of polymerization of the methyl ester of acrylic acid.

EMIL GEISEL.